AUTOMATIC CONTROL AND ALERTING SYSTEM (CONELRAD)
Filed Nov. 16, 1962
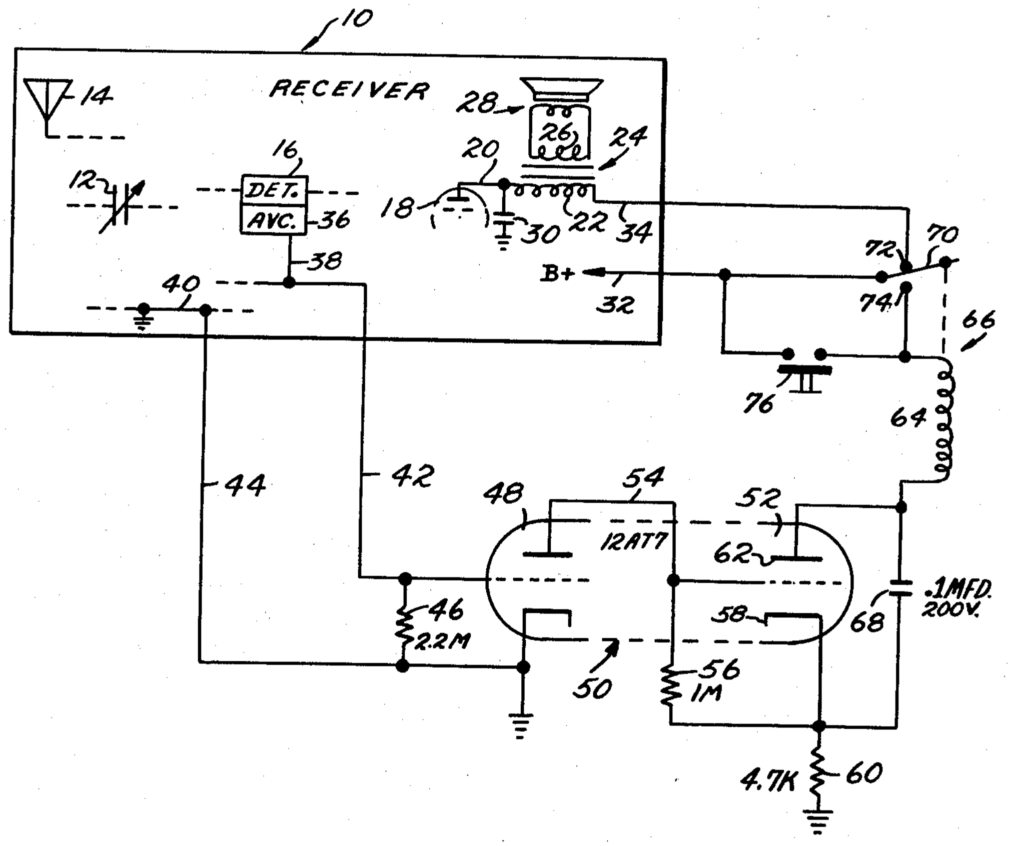
INVENTORS
OTTO HERSCHKOWITZ
HOWARD L. WOODARD
JIMMY G. VANNS
BY
Cushman, Darby & Cushman
ATTORNEYS United States Patent Office 3,153,197

Patented Oct. 13, 1964

3,153,197

AUTOMATIC CONTROL AND ALERTING SYSTEM (CONELRAD)

Otto Herschkowitz, 319 Chesterfield, Nashville, Tenn.; Howard L. Woodard, 306 Hancock St., Nashville, Tenn.; and Jimmy G. Vanns, 736 Adkisson St., Nashville, Tenn.

Filed Nov. 16, 1962, Ser. No. 238,148

5 Claims. (Cl. 325—364)

This invention relates to an automatic control circuit, and particularly to such a circuit that is useful with radio or like type receivers that are capable of reproducing audio or similar modulation signals. The invention also relates to a receiver in combination with such a control circuit that keeps the receiver effectively muted during the receipt by the receiver of a carrier wave, such as a modulated carrier. However, if the carrier ceases, the control circuit automatically stops its muting function and allows the receiver to operate thereafter in a normal fashion to reproduce any subsequently received modulation.

The invention is therefore particularly adaptable for use in connection with the Civilian Defense system frequently referred to as the "Conelrad" system by which emergency alerts and messages or the like may be promulgated throughout the country. The system operates favorably with the present Conelrad system, because a broadcast station is required thereby to interrupt its carrier before transmitting a Conelrad message. In addition to its usefulness with the Conelrad system, it will be apparent that this invention may be utilized in many other environments wherein muting during normal reception is desired and indication of cessation of normal reception is required.

Many times, it is desired to monitor a station to receive important information therefrom when it is delivered, but to eliminate all undesired or "non-essential" information that may be broadcast by that station so as to effect complete silence from the receiver during the non-essential information times. A receiver in accordance with the present invention may be muted to eliminate the non-essential information, but is capable of being triggered back into a reproducing status by the intentional interruption of the carrier of the station to which the receiver is tuned. Previous proposals of this general nature give an alarm produced by regeneration in a receiver during carrier interruption, but in many cases this is annoying to the listener. A disadvantage, too, is that the listener must reach the receiver to silence the alarm before a message can be received.

It is therefore an object of the present invention to provide an alerting system that produces no alarm other than that which is transmitted by the broadcasting station and permits immediate listening to any message from that station without attending the receiver.

Another object of this invention is the provision of an automatic control circuit which may be incorporated into any ordinary radio to effect a combination which is utilizable in a Conelrad alert or similar control system.

Other objects and advantages of this invention will become apparent to one of ordinary skill in the art upon reading the appended claims and the following detailed description in conjunction with the attached drawing.

In the drawing, block 10 refers to any type of receiver which operates on a carrier wave to produce a D.C. voltage, such as the negative voltage present in an automatic volume control (AVC) circuit that is generally proportional in negative magnitude to the strength of the carrier wave received. In addition, receiver 10 is of the type that reproduces any audio modulation that is on the carrier to which the receiver is appropriately tuned, the modulation of the carrier being detected in conventional fashion by the receiver and applied to an output circuit, such as the audio power amplifier and loudspeaker output transformer.

In more detail, receiver 10 may be tunable for example by at least one variable condenser 12 to select any desired station and receive via antenna 14 the carrier wave and its modulation from that station. If desired, continuously variable tuning need not be employed, but instead the receiver may be pre-tuned to a desired station by a switch set in one position another or other positions of which tune the receiver to one or the other of the Conelrad frequencies (640 and 1240 kc.) for example.

By superheterodyne operation, the received modulated carrier wave is amplified and transformed into a given IF frequency in conventional manner by circuitry not shown, then the modulation is detected by detector 16. The output of this detector is then coupled, via intermediate audio amplifiers as desired, to the audio output stage which may include, for example, power amplifying tube 18 the plate of which is connected by line 20 to the primary winding 22 of an output transformer 24. Secondary winding 26 is then connected to the voice coil of loudspeaker 28. Generally, the plate of tube 18 is coupled to ground by a condenser 30 for reasons well known. Operating voltage (B+) as available in the receiver on line 32 is normally connected directly to line 34 and primary winding 22 of the output transformer, to provide sufficient voltage to the plate circuit of tube 18 so that the required amplification thereof may be available. Of course, in the absence of such voltage, tube 18 cannot operate at all, and no signal is applied to the sound reproducer 28.

In addition, receiver 10 includes any conventional type AVC circuit 36 for developing on line 38 an AVC voltage, which is D.C. and negative relative to the receiver reference potential such as ground on line 40, due to receipt at antenna 14 of a tuned-in carrier wave, all in normal fashion. In many existing radio receivers, the AVC voltage may be available from across the volume control, though limitation to extracting the AVC voltage therefrom for purposes of this invention is not intended.

The automatic control circuit of this invention is illustrated in the drawing as those portions of the circuit shown outside receiver block 10 and connected thereinto. The negative AVC voltage available between lines 38 and 40 is extracted by lines 42 and 44 to appear across biasing resistor 46 and the grid-cathode circuit of triode section 48 of the dual-triode tube 50. Section 52 of this tube has its grid connected to the plate of the other section by line 54 which further connects through resistor 56 to cathode 58 which is held above the reference potential or ground by resistor 60. Plate 62 is in turn connected to coil 64 of relay 66. A high frequency by-pass condenser 68 may be utilized in parallel with tube section 52.

Relay 66 includes a single pole double throw switch 70 that has a normal up position during which time it is against terminal 72 for purposes of completing the B+ connection from line 32 to line 34 in the audio output circuit of the receiver. On the other hand, switch 70, when sufficient current traverses relay coil 64, moves to a downward position against terminal 74, thereby diverting the B+ voltage to coil 64. Energization of relay 66, to cause such movement of its switch 70, can be effected by momentary depression of the manually operable push button switch 76, if at the same time the receiver is receiving a carrier wave which causes a sufficient negative AVC voltage on line 42 so that tube section 48 becomes non-conductive and thereby effectively gates on tube section 52 so that it can conduct relay coil current. This current is sufficient to cause the relay to pull in and effect its own holding circuit by connecting the B+ voltage on line 32 to switch terminal 74, meaning that push button switch 76 can be released as soon as the relay pulls in.

With the relay so energized, the output circuit of the receiver is disconnected from its operating voltage, and speaker 28 is therefore muted. However, if the carrier wave ceases so that the previous negative AVC voltage on line 42 subsides toward zero so that tube section 48 can conduct, this causes a greater current to be drawn through cathode resistor 60 and the resultant grid to cathode voltage of tube section 52 is such as to gate this tube section to a non-conductive status whereby current ceases to flow through relay coil 64. Consequently, relay 66 releases and switch 70 returns to its normal up position to complete the connection of the B+ voltage to the audio output circuit. As before indicated, this allows any subsequently detected modulation to be reproduced audibly by speaker 28.

It will be therefore apparent that tube 50 is in effect a D.C. amplifier operating in response to the AVC voltage to effect an automatic open circuit. During the time that relay 66 is energized, no current drain is effected by the power output section of the receiver. Consequently, considerably less power drain is required by this invention than by prior art systems wherein plate voltage is continuously applied to the audio output tubes even during silent monitoring of a station. Tube section 52 and relay 66 require a relatively small amount of power.

Without limitation intended, exemplary parameters are given on the drawing for components in the external control circuit. It should be understood that the control circuit can be a separate unit which is adapted to be readily connected into a radio receiver, or that receivers may be manufactured with the control circuit built in initially.

Thus, it is apparent that this invention provides a system and apparatus which will provide for the objects and advantages herein stated, as well as those which one of ordinary skill in the art will advance after reading this disclosure. Modifications not indicated by the above disclosure may be made within the scope of this invention as defined by the appended claims, since the foregoing disclosure is intended to be illustrative and not limitative.

What is claimed is:

1. An automatic control circuit for use with a radio or like type receiver which develops a D.C. voltage only during receipt of a carrier wave any modulation of which is normally reproduced after traversing a given circuit that is fed by a voltage source, comprising: switch means having a normal first position for completing said given circuit through a first terminal and a second position for opening said circuit by diverting the voltage of said source to a second terminal, switch operating means operable, when energized by said voltage source and effectively gated on by said D.C. voltage, to move said switch means to said second position, and means for temporarily connecting said voltage source to said second terminal to cause momentary energization of said switch operating means while said switch means moves as aforesaid to said second position to then cause continued energization of the switch operating means as long as said D.C. voltage remains present and until that D.C. voltage effectively ceases and thereby gates off said switch operating means.

2. An automatic control as in claim 1 wherein said switch means and switch operating means include a relay having a coil and a single pole double throw switch, and a D.C. amplifying circuit responsive to the presence of said D.C. voltage for supplying current to said coil to operate said relay switch.

3. An automatic control as in claim 1 wherein said means for momentary energization of the said switch operating means includes a manually operable switch.

4. In combination: a radio receiver having an automatic volume control circuit for generating a negative D.C. voltage only during receipt by said receiver of a carrier wave, said receiver being of the type to handle a modulated carrier and including an output circuit through which said modulation normally traverses to be reproduced as an audible signal, voltage source means for feeding said output circuit with a required voltage, switch means in said output circuit and having a normal first position for connecting said voltage source through a first terminal to the said output circuit and having a second position for disconnecting said circuit therefrom by diverting the voltage from said source to a second terminal, switch operating means operable when enerziged by said voltage source and effectively gated on by said negative D.C. voltage to move said switch means to said second position, and means for temporarily connecting said voltage source to said second terminal to cause momentary energization of said switch operating means while said switch means moves as aforesaid to said second position to then cause continued energization of the switch operating means as long as said negative D.C. voltage remains present and until that negative voltage substantially ceases in response to effective cessation of said carrier wave to gate off said switch operating means and cause said switch means to return to its said normal first position for completing said output circuit and allowing said receiver to reproduce any subsequently received modulation.

5. The combination of claim 4 wherein said switch means and switch operating means include first and second triodes each having a respective plate, cathode, and grid, and further includes a relay having a coil coupled to the plate of the second triode and a single pole double throw switch operative in the manner aforesaid for said switch means, said negative D.C. voltage being coupled across the grid and cathode of said first triode the plate of which is connected to the grid of the second triode and to the cathode thereof, the latter said cathode being biased above a predetermined reference potential to which the cathode of the first triode is connected for providing operating potential for the said first triode, said momentary energization means including a manually operable switch.

References Cited in the file of this patent

UNITED STATES PATENTS

| | | |
|---|---|---|
| 2,870,325 | Sanger | Jan. 20, 1959 |
| 2,882,390 | Kuhl | Apr. 14, 1959 |